March 6, 1934.  R. GEH  1,949,795
DEVICE FOR MEASURING WORKPIECES
Filed April 7, 1933
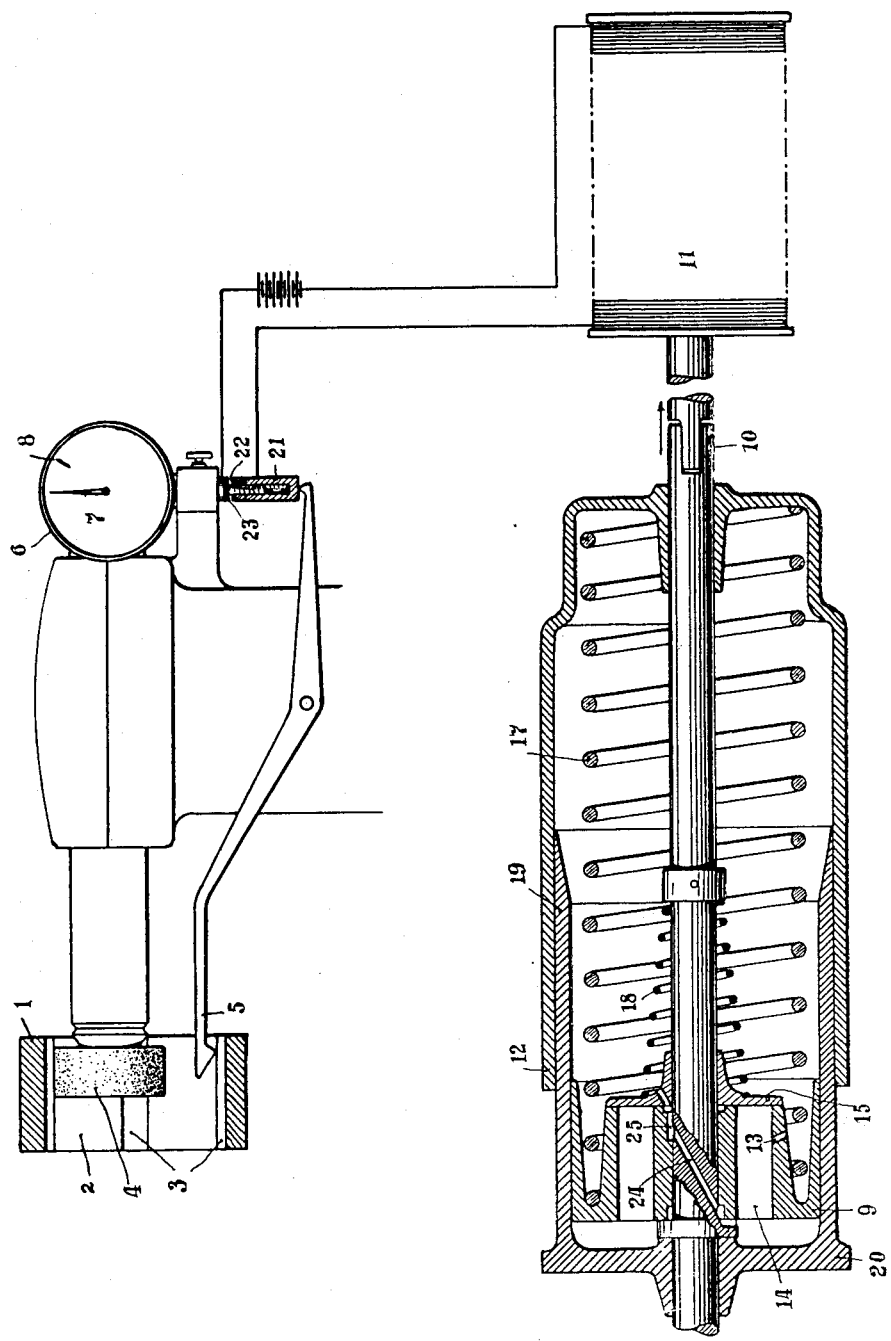
Inventor:
Rudolf Geh Patented Mar. 6, 1934

1,949,795

UNITED STATES PATENT OFFICE 1,949,795

DEVICE FOR MEASURING WORKPIECES

Rudolf Geh, Berlin-Charlottenburg, Germany

Application April 7, 1933, Serial No. 664,910
In Germany April 2, 1932

6 Claims. (Cl. 51—165)

When measuring workpieces in work by means of a measuring instrument equipped with a movable feeler, the feeling of the surface of the workpiece to be worked for the purpose of ascertaining the measurement was very difficult if not impossible, because as soon as the feeler lever bears against or releases the workpiece or, in the case of workpieces with surfaces interrupted by grooves or the like, arrived at a depression, the feeler lever deflected, this movement being transmitted to the measuring instrument, for example measuring dial, without any real alteration in the dimensions of the surface of the workpiece to be worked.

It was likewise impossible to work workpieces with surfaces interrupted by grooves or the like on machines in which the measuring instrument automatically, for example electrically, controls the machine in known manner on attaining the finished measurement because, owing to the deflection of the feeler lever on reaching one of the recesses in the workpiece, the circuit will close and consequently a premature controlling of the machine take place.

It has already been endeavoured to overcome this objection by reducing the swinging movements of the feeler lever to the minimum and only allowing the feeler lever to become operative when the finished measurement has nearly been attained. This arrangement cannot, however, prevent a premature controlling of the machine.

This objection is overcome according to the invention in that an element with retarded operation is provided, which only acts on the control of the machine in the event of a constant electric impulse independent of the feeler lever.

An embodiment of the invention is illustrated by way of example in the only figure of the accompanying drawing through the general arrangement of the device, the arrangement for controlling an electric circuit being shown in longitudinal section.

According to the drawing the workpiece 1 has a bore 2 and four grooves 3. The bore of the workpiece is to be ground to a certain measurement by means of a grinding wheel 4. A feeler lever 5 bears against the wall of the bore of the workpiece and is suspended so that it can deflect in known manner and more gradually further away from the axis of rotation of the workpiece and, on attaining according to the progress of the grinding, the finished measurement, influences a measuring device, for example a fine measuring instrument 6, so that the hand 7 points to a previously adjusted mark 8. At this moment the measurement closes in known manner a circuit by means of which the machine is automatically controlled for the subsequent operation.

However, in the case of workpieces provided with grooves the lever 5, as soon as it enters a depression 3, would already cause a deflection of the measuring instrument hand 7 beyond the mark 8, if no abutment is provided. In this instance the circuit would be closed and cause the control of the machine for the next following operation without the workpiece being ground to the finished measurement.

According to the invention this deflecting movement of the feeler lever 5 is utilized, namely thereby that the lever can enter freely or limited to a certain extent into the depressions 3. Thus, a strong movement is imparted to the hand 7 of the measuring instrument 6 so that, as stated above, the contact of the circuit for controlling the machine would be permanently closed. According to the invention, however, the closing of the circuit for controlling the machine is rendered uneffective in that an arrangement is inserted in the circuit or in the series of elements for controlling the machine, the effectiveness of which is temporarily retarded.

Such an arrangement consists of a cylinder 12, in which a piston 9 is slidable which has a rod 10 connected in a suitable manner with a magnet 11 to which current is supplied when the hand 7 of the measuring instrument 6 reaches the mark 8 which at the same time is the contact point for the finished measurement. In spite of the fact that the piston rod 10 and consequently the piston 9 are moved in the direction of the arrow by the magnet 11, the machine is, however, not reversed because the piston has only a narrow bore 13 and the cylinder is filled with liquid which must pass through this bore 13.

As the cross sectional area of this bore 13 is of such size that the passage of the liquid can only take place relatively slowly, the piston, although it is moved in the direction of the arrow, cannot complete its stroke because, in the meantime, the circuit is again interrupted by the deflection of the hand 7, so that the magnet 11 becomes currentless.

The piston then returns because it has also a large bore 14 which is closed by a valve 15 pressed against the piston by a spring 18. This pressure of the spring is, however, much less great than the pressure of the spring 17 which tends to shift the piston in the opposite direction to the arrow. Consequently, the piston is returned into its initial extreme position. This series of operations continues until the deflection of the feeler lever 5 and consequently also of the hand 7 ceases entirely, which only occurs when the hand 7 actually and continually points to the mark 8 which indicates the finished measurement. Therefore, only when the feeler lever 5 and the hand 7 are absolutely steady, current is continually supplied to the magnet 11 and the piston is drawn, if only slowly, in the direction of the arrow to the end of the cylinder, thereby actuating the control of the machine. This control may be effected by electrical, mechanical or hydraulic auxiliary means or in any other manner. For example, the piston might have a second piston rod 18 which is connected in a suitable manner with a known throw-over clamping mechanism, not shown on the drawing, but which reverses as soon as the piston 9 reaches its extreme outer position on the right of the drawing. It is evident that the piston rod 18 might be constructed as a sliding contact which closes a circuit for the control of the machine as soon as the piston has terminated its movement in the direction of the arrow.

In order, however, not to unnecessarily retard this control, it is possible to provide in the device with retarded operation, an arrangement which enables the movement of the piston to be retarded or accelerated. For this purpose the piston rod 10, 18 may for example have a bore 24 through which the liquid or air contained in the cylinder in front of the piston 9 can flow to behind the piston because grooves 25 of different widths are provided in the piston bore which alone expose the bore and by means of which the cross sectional area for the passage of the liquid can be enlarged or reduced by turning the piston rod, so that thereby a retarded or accelerated movement of the piston can evidently be attained.

It is further advisable to accelerate the last portion of the movement of the piston 9 to effect a sudden closing of the circuit. This can be attained by fitting an insert 19 in the cylinder, which insert is for example rigidly connected to the end plate 20 of the cylinder 12 and screwed into the cylinder. This insert has a conically widening bore so that, as soon as the piston enters this widened bore, the liquid can flow freely around the piston into the rear portion of the cylinder so that the piston is moved precipitately in the direction of the arrow and suddenly actuates the control of the machine. The movement of the lever 5 can, according to the invention, be also limited in that a shoe 21 or the like brakes the movement of feeler lever 5 of the measuring instrument. This shoe is adjustably connected to an extension of the measuring instrument for example by means of a screw thread. As, however the shoe 21 has an abutment face 22 which bears against a lower, rigid face 23 of the measuring instrument, this instrument can always only perform a movement which corresponds to the distance between the face 22 and the face 23, and this distance may be very small, because the screw thread connection evidently allows a very fine adjustment of the shoe 21. When, however, the faces 22 and 23 remain in contact, the circuit is closed in the manner described because the hand 7 has reached the mark 8.

It is preferable, to arrange the feeler lever or the measuring device so that it correspondingly follows the control of the tool, i. e. of the grinding wheel, whereby the fitting of the measuring device on the machine or on the tool rest is facilitated. It is immaterial for the process, whether the feeler lever is moved with the workpiece or tool transversely or whether it does not follow this movement or is moved in the opposite direction.

Likewise it is advisable to transmit the axial movement of the grinding wheel to the feeler lever, this being important because thereby, besides the above mentioned advantages of the arrangement, the further advantage is obtained, that it is then possible to ascertain whether the bore to be ground extends absolutely cylindrical or conical, as, when grinding bores, the bending of the relatively thin grinding spindle can easily cause the boring of a tapered hole to vary so that it shows at one end the finished measurement and at the other end an under measurement.

If, however, the feeler follows the movement of the grinding wheel in axial direction, the hand will not come to rest and consequently an effective operation of the control is prevented. It is evident that in this manner the progress of the work can be perfectly observed, seeing that it is only necessary to watch the swinging of the hand.

It is apparent that, in the case of strong agitation of the hand of the measuring instrument, there is still a considerable amount of material to be removed from the workpiece. Only when the deflections of the hand are very slight, has the workpiece nearly attained the finished measurement. The arrangement with temporarily retarded effectiveness might evidently also actuate an acoustic or light signal, for example a flash signal, which draws the attention of the operator to the fact that the machine has been reversed. This arrangement can also evidently be employed both for workpieces with continuous and also interrupted surfaces, and the device can be used for measuring cylindrical or tapered outer or inner surfaces and also straight surfaces because it is only necessary to change the adjustment or the position of the measuring instrument or of the feeler lever relative to the workpiece.

As the feeler lever follows the axial movement of the grinding wheel, the feeler lever is also run out when the grinding wheel is run out of the workpiece so that the workpiece lies absolutely free and can be removed without difficulty and replaced by a fresh workpiece. This operates particularly favourably in workpieces which, owing to their external shape, must be clamped from their end side. The clamping parts in most cases then prevent the employment of a feeler of a measuring instrument which is arranged laterally of the workpiece on the headstock or machine bed.

The above described measuring device is particularly advantageous also in the case of workpieces in which both the bore and also the end face are to be ground simultaneously because, owing to the arrangement of the feeler parallel to the inner grinding spindle, the end face is completely exposed for the laterally arranged grinding wheel.

Care must be taken that, when the feeler lever is released, for example when running same out of the bore or when it slips off the surface to be worked, the measuring instrument is also brought into a position of rest which, however, in this instance does not actuate the control of the machine as for this purpose the circuit can either be interrupted automatically by moving the workpiece or tool rest or by hand and is again closed in the case of fresh adjustment.

I claim:—

1. A device for measuring workpieces during work by means of a measuring instrument, comprising in combination with the measuring instrument, a feeler lever adapted to bear against the workpiece and to actuate said measuring instrument, and an element with temporarily retarded operation controlled by electric impulses imparted by said measuring instrument and adapted to become operative only in the case of a constant electric impulse dependent upon said feeler lever.

2. A device as specified in claim 1, comprising in combination with the feeler, the measuring instrument, and the workpiece movable in transverse direction, means for preventing the transverse movement of said measuring instrument, and means for causing said feeler to follow the variations in the surface being ground until the finished measurement is reached.

3. A device as specified in claim 1, comprising in combination with the feeler, the measuring instrument and the tool movable in transverse direction, means for preventing the transverse movement of said measuring instrument, and means for causing said feeler to follow the variations in the surface being ground until the finished measurement is reached.

4. A device as specified in claim 1, comprising in combination with the feeler lever and the tool, means for interrupting the control circuit when said lever has been run sufficiently far out of said workpiece.

5. A device as specified in claim 1, comprising in combination with the feeler lever and the measuring instrument, an adjustable abutment on said instrument serving as rest for said lever.

6. A device as specified in claim 1, comprising in combination with the feeler lever and the measuring instrument, an adjustable abutment on said instrument serving as rest for said lever, and adapted to directly limit the movement of said feeler lever.

RUDOLF GEH.